United States Patent [19]
Lee

[11] Patent Number: 5,802,950
[45] Date of Patent: Sep. 8, 1998

[54] BRAKE BOOSTER FOR VEHICLES

[75] Inventor: Wang Soo Lee, Seoul, Rep. of Korea

[73] Assignee: Mando Machinery Corporation, Kyungki-Do, Rep. of Korea

[21] Appl. No.: 773,785

[22] Filed: Dec. 24, 1996

[30] Foreign Application Priority Data

Dec. 27, 1994 [KR] Rep. of Korea ........................ 95-58671

[51] Int. Cl.$^6$ .................................................. F15B 9/10
[52] U.S. Cl. ........................................................ 91/376 R
[58] Field of Search ............................. 91/369.1, 369.2, 91/376 R

[56] References Cited

U.S. PATENT DOCUMENTS

| | | | |
|---|---|---|---|
| 4,716,814 | 1/1988 | Yamakoshi | 91/376 R |
| 5,031,507 | 7/1991 | Bornemann et al. | 91/376 R X |
| 5,235,897 | 8/1993 | Watanabe | 91/376 |
| 5,249,505 | 10/1993 | Hewitt | 91/376 R |
| 5,558,001 | 9/1996 | Osaka et al. | 91/376 R |
| 5,630,350 | 5/1997 | Verbo et al. | 91/376 R |
| 5,664,475 | 9/1997 | Gautier et al. | 91/376 R X |

*Primary Examiner*—Hoang Nguyen
*Attorney, Agent, or Firm*—Foley & Lardner

[57] ABSTRACT

A brake booster for vehicles prevents suction noise that is generated from a rapid inflow of air from being emitted to the outside. The brake booster includes a casing, a diaphragm mounted in the casing by which a constant-pressure chamber and a varying-pressure chamber are isolated from each other, a valve body one end of which is fixed to the inner surface of the diaphragm and the other end of which includes an air suction area, a poppet valve mounted in the valve body to connect or disconnect the varying-pressure chamber to the outside, an input shaft one end of which is arranged in the valve body to operate the poppet valve, an output shaft transmitting to a master cylinder the force boosted by the pressure difference between the constant-pressure chamber and the varying-pressure chamber, and a noise barrier mounted in the valve body.

20 Claims, 4 Drawing Sheets

BRAKE BOOSTER FOR VEHICLES

BACKGROUND OF THE INVENTION

This invention relates to a brake booster for vehicles, and more specifically to a brake booster for vehicles which has a noise barrier mounted on the input shaft in a valve body in order to effectively prevent the suction noise, generating between a poppet valve and a second valve seat during inflow of air, from emitting outside.

A brake booster for vehicles is an apparatus which creates great braking force with small input force utilizing the pressure difference between the inside vacuum thereof and the outside atmospheric pressure. FIG. 1 shows a conventional brake booster for vehicles. The brake booster has a casing 10 which consists of a front shell 11 and a rear shell 12. The interior of the casing 10 is divided into a constant-pressure chamber 15 and a varying-pressure chamber 16 by a diaphragm 13 and a power piston 14, which form a front chamber and a rear chamber, respectively. The constant-pressure chamber 15 and the varying-pressure chamber 16 communicate with each other through a constant-pressure passage 19 formed in a valve body which will be described hereinafter.

On the outer wall of the constant-pressure chamber 15 is provided a negative pressure inlet pipe 17 such as a suction manifold by which the interior of the constant-pressure chamber 15 and a negative pressure source (not shown) are communicated with each other. A spring 18 is provided in the constant-pressure chamber 15. The diaphram 13 and the power piston 14 are maintained in a rear position by the returning force of the spring 18 when the brake booster is in non-operation.

Further, a valve body 20 is mounted in the interior of the casing 10. One end of the valve body 20 is fixed to the diaphram 13 and the power piston 14. The other end of the valve body 20 extends to the outside from the rear end of the casing 10, which is advanced and retreated by the movement of the input shaft 30 which will be described hereinafter. An air suction area 21 is provided on the other end of the valve body 20, which communicates with the atmosphere. Filters 22 are mounted in the air suction area 21 to prevent inflow of foreign matters.

Such a valve body 20 is cylindrical in shape, on the front end of which a cylinder 23 is positioned axially. In cylinder 23 is provided a plunger 24 which slides therein. The rear end of the plunger 24 is fitted to the front end of the input shaft 30 which is connected to a brake pedal (not shown). An output shaft 40 is provided at the front end of the plunger 24. Between the front end of the plunger 24 and the output shaft 40 is arranged a reaction disk 41 which boosts the actuating force thereon utilizing the difference of sectional areas and transmits it to the output shaft 40.

Further, a poppet valve 50 of flexible material is provided in the valve body 20. The rear end of the poppet valve 20 is firmly fitted to the inner surface of the valve body 20. On the outer surface of the input shaft 30 is formed a fixing projection 31, and a spring 32 is arranged between the fixing projection 31 and the poppet valve 50. The input shaft 30 is urged backward by the elastic force of the spring 32.

The valve body 20 also includes a constant-pressure passage 19 by which the constant-pressure chamber 15 and the internal space of the valve body 20 are communicated with each other, a varying-pressure passage 19a by which the varying-pressure chamber 16 and the internal space of the valve body 20 are communicated with each other, and a first valve seat 25. The constant-pressure passage 19, which communicates the constant-pressure chamber 15 with the varying-pressure chamber 16, is opened or closed as the front end of the poppet valve 50 seals up or removes from the first valve seat 25 by the advancing or retreating movement of the input shaft 50. A vacuum valve is formed by the interaction of the poppet valve 50 and the first valve seat 25. Namely, when the front end of the poppet valve 50 is seated in the first valve seat 25, the constant-pressure passage 19 is closed so that the interconnection of the constant-pressure chamber 15 and the varying-pressure chamber 16 is isolated.

A second valve seat 26 is provided on the rear end of the plunger 24 engaged with the front end of the input shaft 30.

When the front end of the poppet valve 50 is seated in the second valve seat 26 according to the movement of the input shaft 30, inflow of the outside air into the varying-pressure chamber 16 is isolated. An air valve is formed by the interaction of the poppet valve 50 and the second valve seat 26.

The operation of the conventional brake booster for vehicles is performed as follows.

In an initial state, the constant-pressure chamber 15 and the varying-pressure chamber 16 are maintained in a vacuum state by the action of the negative pressure source. In this state, if the driver pushes the brake pedal to stop the vehicle or reduce speed, the input shaft 30 advances, and at the same time the plunger 24, which is engaged with the front end of the input shaft 30, is pushed downwards as seen from FIG. 1. Thus, the poppet valve 50 and the second valve seat 26 placed on the rear end of the plunger 24 are isolated from each other and the poppet valve 50 is seated in the first valve seat 25. As a result, the poppet valve 50 and the first valve seat 25 function as a vacuum valve, while the constant-pressure passage 19 is closed so that the interconnection of the constant-pressure chamber 15 and the varying-pressure chamber 16 is isolated.

Through a gap caused by the separation of the poppet valve 50 and the second valve seat 26, the outside air flows into the varying-pressure chamber 16 through the air suction area 21 and the varying-pressure passage 19a. The outside air of the atmospheric pressure is rapidly introduced into the varying-pressure chamber 16 in vacuum state by the pressure difference therebetween. Therefore, the diaphragm 13 and the power piston 14 are rapidly pushed toward the constant-pressure chamber 15 by the pressure difference between the constant-pressure chamber 15 and the varying-pressure chamber 16. Thus, the reaction disk 41, which is placed at the center portion of the power piston 14, pushes the output shaft 40 with a boosting force much more than the initial force by the driver. Next, the output shaft 40 pushes the master cylinder 60 to generate a high brake pressure which is transmitted to wheel cylinders (not shown) to perform the braking function. These successive actions are carried out in a very short time.

When the driver takes his foot off the brake pedal, the plunger 24 and the input shaft 30 are returned into their original positions by the elastic force of the spring 18 and the power piston 14, and at the same time the second valve seat 26, placed at the rear end of the plunger 24, pushes the poppet valve 50 to separate the poppet valve 50 from the first valve seat 25. Accordingly, the constant-pressure chamber 15 and the varying-pressure chamber 16 are connected with each other in a moment, so that the air in the varying-pressure chamber 16 escapes to the constant-pressure chamber 15 in vacuum state through the constant-pressure passage 19. Also, the constant-pressure chamber 15 is again maintained in vacuum state by the action of the negative pressure source, thereby returning the brake booster into the initial standby state.

In such a conventional brake booster for vehicles operating as described above, suction noise is inevitably generated when the outside air of the atmospheric pressure rapidly flows into the varying-pressure chamber 16 in vacuum state by the pressure difference therebetween. That is, when the brake booster operates, by the pressure difference between the atmospheric pressure and the negative pressure of the varying-pressure chamber 16, the outside air enters into the varying-pressure chamber 16 at a high speed through a gap between the air suction area 21 and the filters 22. When the air flows through the gap, the direction of the air flow is suddenly changed perpendicularly, and therefore a great flow resistance is generated.

In order to prevent such suction noise from emitting outside, the conventional brake booster has a silencer 27 provided between the filters 22 mounted in the air suction area 21 of the valve body 20. However, the suction noise emitted toward the outside is not prevented very well by the silencer 27. Due to this suction noise, the driver feels uneasy and gets tired in a short time.

SUMMARY OF THE INVENTION

An objection of this invention is therefore to provide a brake booster for vehicles which can effectively prevent the suction noise, which is generated due to a rapid inflow of air, from emitting outside.

To achieve the above object, this invention comprises: a casing; a diaphragm mounted in the casing by which a constant-pressure chamber and a varying-pressure chamber are isolated from each other; a valve body one end of which is fixed to the inner surface of the diaphragm and the other end of which includes an air suction area; a poppet valve mounted in the valve body to connect or disconnect the varying-pressure chamber to the outside; an input shaft one end of which is arranged in the valve body to operate the poppet valve; an output shaft transmitting to a master cylinder the force boosted by the pressure difference between the constant-pressure chamber and the varying-pressure chamber; and a noise barrier mounted in the valve body to prevent the suction noise, generated when the outside air flows into the casing, from emitting outside.

The noise barrier is formed of disk shape, and comprises an opening to insert itself into the input shaft and a plurality of holes to guide the air passing through the air suction area. The opening is formed at the center of the noise barrier and the holes are formed around the opening.

When the outside air is introduced into valve body through the air suction area by the operation of the brake booster, the air is again directed to the varying-pressure chamber through the holes. On the other hand, the noise, generated when the air passes through the air suction area, is reflected and dissipated in the inner space of the valve body by the noise barrier, thereby preventing the noise from emitting outside.

BRIEF DESCRIPTION OF THE ATTACHED DRAWINGS

DETAILED DESCRIPTION OF A PREFERRED EMBODIMENT

A preferred embodiment of a brake booster for vehicles according to this invention will now be described referring to the attached drawings. The structure of the brake booster according to this invention is identical with that of the above described prior art excepting the structure of the valve body. Therefore, the same parts as those of the prior art will be designated as same numerals.

Figure 1:
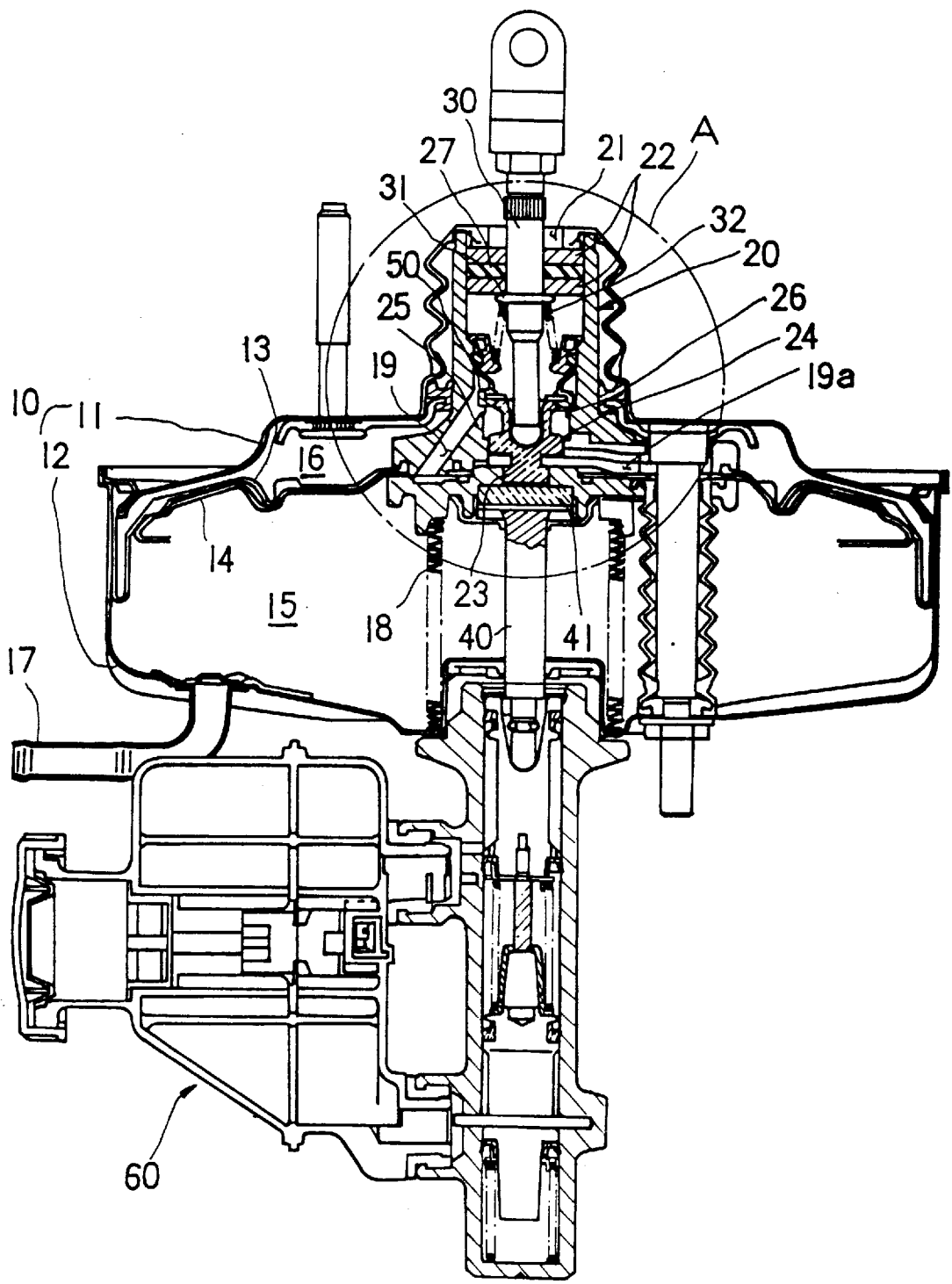
FIG. 1 is a cross-sectional view of a conventional brake booster for vehicles.
Figure 2:
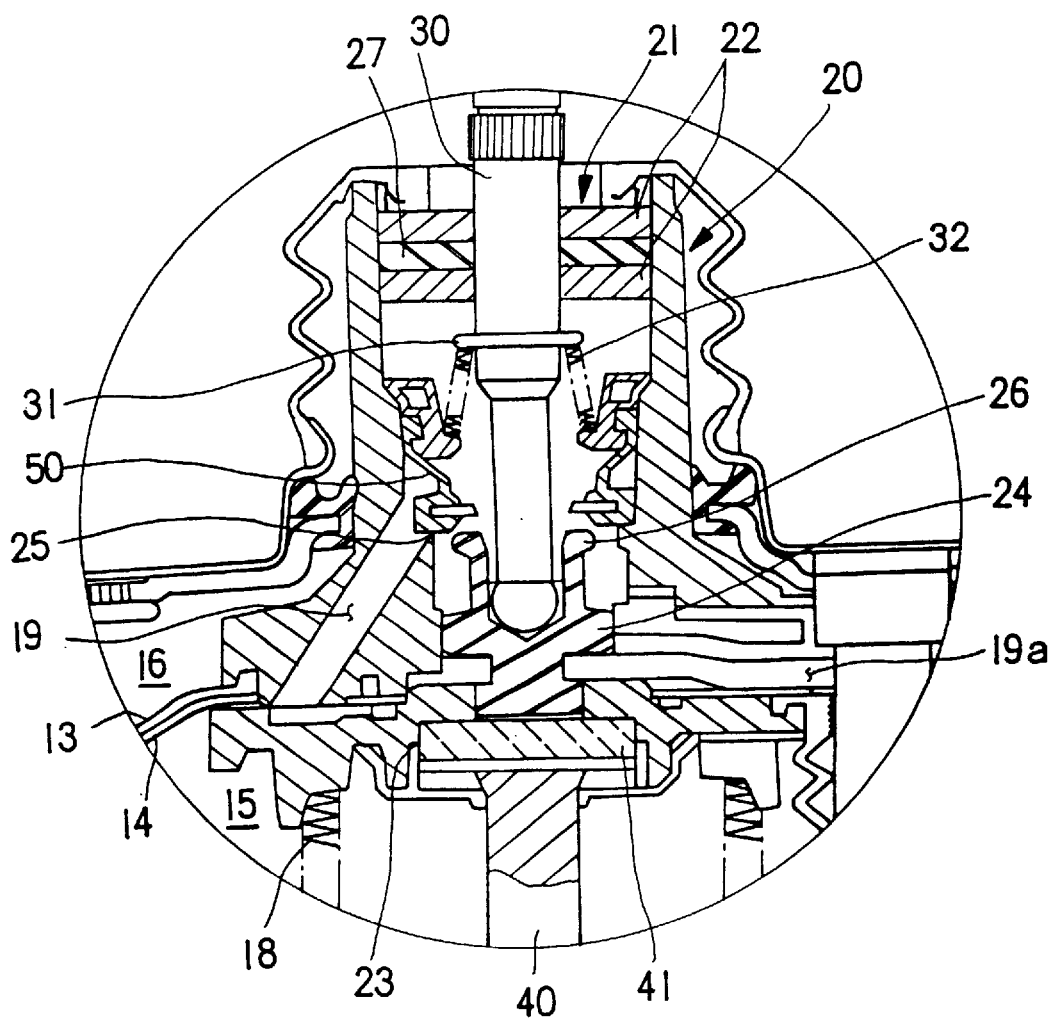
FIG. 2 is an enlarged cross-sectional view of the circle "A" in FIG. 1.
Figure 3:
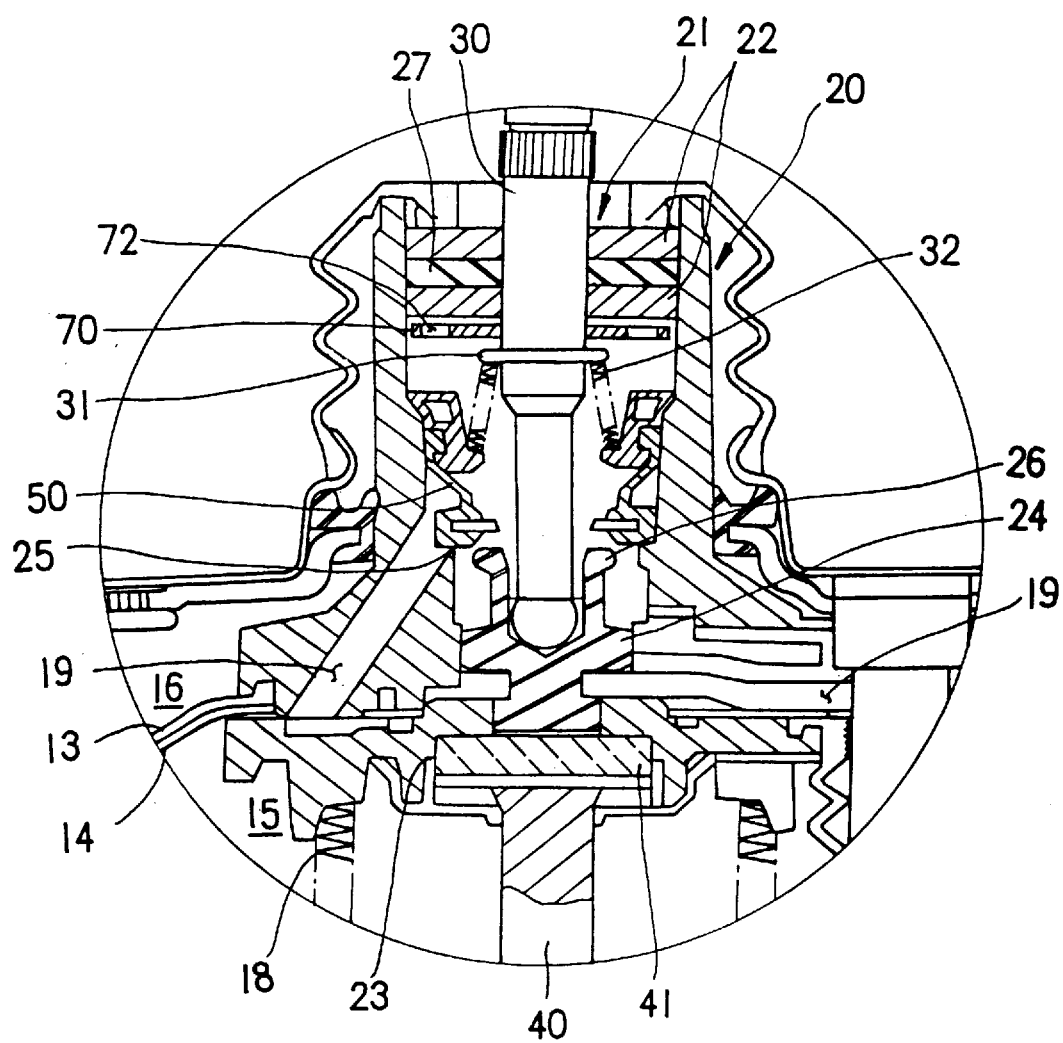
FIG. 3 is a cross-sectional view of a portion of a brake booster according to this invention, which corresponds to FIG. 2 showing a prior art.

FIG. 1 generally shows the structure of a brake booster for vehicles to which this invention is adapted, and FIG. 3, which is an enlarged cross-sectional view of the circle "A" in FIG. 1, shows a valve body according to this invention.

In the brake booster according to this invention, the internal space of a casing 10 is isolated into a constant-pressure chamber 15 and the varying-pressure chamber 16 by a power piston 14 and a diaphragm 13. A valve body 20 is also mounted in the casing 10 to control the flow direction of air entered.

One end of the valve body 20 is fixed to the diaphragm 13 and the power piston 14, and at the other end of the valve body 20 is formed an air suction area 21 for flowing the outside air into the valve body 20. A plunger 24 slides in a cylinder 23 provided in the valve body 20. One end of the plunger 24 is engaged with the front end of the input shaft 30 which is connected to the brake pedal (not shown), and the other end of the plunger 24 is engaged with the output shaft 40 through a reaction disk 41.

In the valve body 20 is also mounted a poppet valve 50 either to connect the varying-pressure chamber 16 to the outside air and disconnect the varying-pressure chamber 16 to the constant-pressure chamber 15, or to disconnect the varying-pressure chamber 16 to the outside air and connect the varying-pressure chamber 16 to the constant-pressure chamber 16.

A noise barrier of a disk shape, a characteristic part in this invention, is mounted between a silencer 27 and a fixing projection 31 for supporting the spring 32 of the input shaft 30 in order to prevent noise from emitting outside. A considerable noise is generated when the outside air flows into the varying-pressure chamber 16 with the operation of the poppet valve 50, but this noise generated in the valve body 20 is reduced and dissipated by the noise barrier 70.

Figure 4:
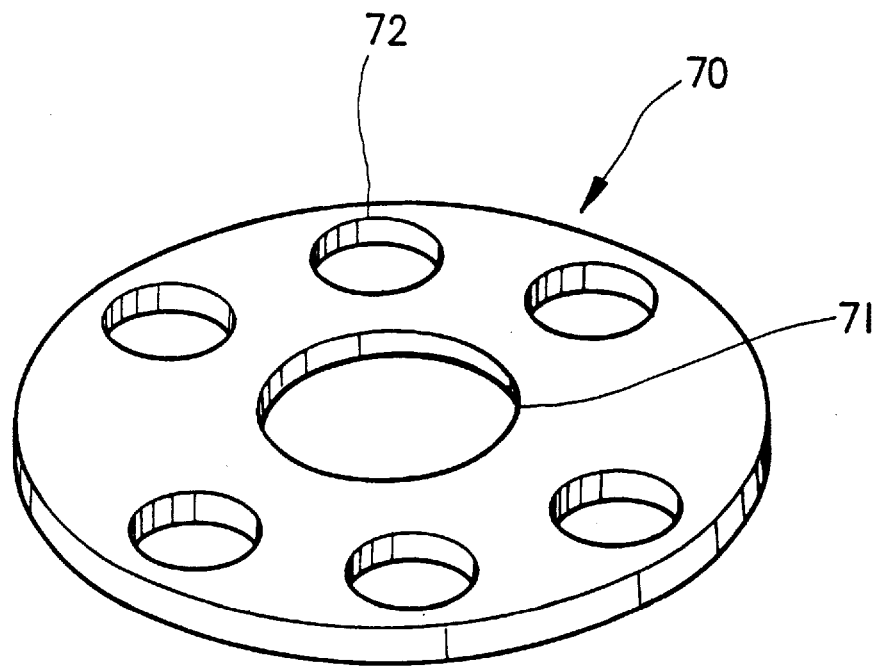
FIG. 4 is a perspective view of a noise barrier according to this invention.

FIG. 4 shows the structure of the noise barrier 70. At the center of the noise barrier 70 is formed an opening 71 through which the noise barrier 70 is inserted into the input shaft 30, and around the opening 71 is formed a plurality of holes 72.

The operation of the brake booster for vehicles according to this invention will be now described in relation to the operation of the noise barrier 70.

As the input shaft 30, which is engaged with the plunger 24 in the valve body 20, advances forward, the plunger 24 is pushed, and at the same time the front end of the poppet valve 50 is separated from the second valve seat 26 and seated in the first valve seat 25. By this movement, while the interconnection between the constant-pressure chamber 15 and the varying-pressure chamber 16 is closed, the outside air flows into the varying-pressure chamber 16 in vacuum state from the air suction area 21 through both a gap between the poppet valve 50 and the second valve seat 26, and the varying-pressure passage 19a. At this time, suction noise is generated by the rapid inflow of air due to the pressure difference between the atmospheric pressure and the vacuum pressure in the varying-pressure chamber 16. This suction noise caused in the valve body 20 is again emitted toward the air suction area 21, but the noise barrier 70, fitted to the outer surface of the input shaft 30, reflects the noise to the inside so as not to emit it to the outside. Accordingly, when the brake booster operates, the suction noise, which is generated by the air flow through the air suction area 21, does not emit to the outside.

As a result, the driver can enjoy driving in the good condition because the suction noise does not transmit to the driver.

What is claimed is:

1. A brake booster for vehicles comprising:

a casing;

a diaphragm mounted in said casing by which a constant-pressure chamber and a varying-pressure chamber are isolated from each other;

a valve body one end of which is fixed to the inner surface of said diaphragm and the other end of which includes an air suction area;

a valve mounted in said valve body to connect or disconnect said varying-pressure chamber to the outside;

an input shaft one end of which is arranged in said valve body to operate said valve;

an output shaft transmitting to a master cylinder the force boosted by the pressure difference between said constant-pressure chamber and said varying-pressure chamber;

a silencer mounted in the air suction area of said valve body to reduce suction noise; and a noise barrier mounted in the air suction area of said valve body between said silencer and said valve to further reduce the suction noise.

2. A brake booster for vehicles according to claim 1, wherein said noise barrier is disk-shaped, and comprises an opening into which said input shaft is inserted and a plurality of holes to guide the air passing through said air suction area, said opening being formed at the center of said noise barrier and said holes being formed around said opening.

3. A brake booster for vehicles according to claim 2, wherein said valve comprises a poppet valve.

4. A brake booster for vehicles according to claim 1, wherein the valve further connects or disconnects the varying-pressure chamber from the constant-pressure chamber.

5. A brake booster for vehicles according to claim 4, wherein the constant-pressure chamber is maintained in a vacuum state.

6. A brake booster for vehicles according to claim 5, wherein an actuation of the input shaft disconnects the varying-pressure chamber from the constant-pressure chamber and connects the varying-pressure chamber to the outside.

7. A brake booster for vehicles according to claim 6, further comprising a return spring connected to the input shaft to urge the input shaft to a neutral position in which the varying-pressure chamber is connected to the constant-pressure chamber and disconnected from the outside, wherein the return spring is disposed between the noise barrier and the valve.

8. A brake booster for vehicles according to claim 7, wherein said noise barrier is disk-shaped and includes a central opening into which said input shaft is inserted and a plurality of holes formed around said central opening.

9. A brake booster for vehicles according to claim 8, wherein said valve comprises a poppet valve.

10. A brake booster for vehicles according to claim 1, wherein an inner diameter of the air suction area is larger than an outer diameter of the noise barrier.

11. A brake booster for vehicles comprising:

a casing having first and second chambers;

a diaphragm separating the first chamber from the second chamber;

a valve alternatively connecting and disconnecting the second chamber with the outside;

an input shaft operating said valve;

an output shaft connected to the diaphragm to provide a brake boost force when the diaphragm moves in response to a pressure difference between the first and second chambers; and a disk-shaped noise barrier mounted in an air suction area between the second chamber and the outside to reduce air suction noise, the noise barrier including a plurality of holes to guide the air passing through the air suction area.

12. A brake booster for vehicles according to claim 11, wherein the noise barrier further includes a central opening around which the holes are arranged, the noise barrier being mounted around the input shaft through the central opening.

13. A brake booster for vehicles according to claim 12, further comprising a silencer mounted in the air suction area between the noise barrier and the outside to further reduce the suction noise.

14. A brake booster for vehicles according to claim 11, wherein the valve further connects or disconnects the second chamber from the first chamber.

15. A brake booster for vehicles according to claim 14, wherein the first chamber is maintained in a vacuum state.

16. A brake booster for vehicles according to claim 15, wherein an actuation of the input shaft disconnects the second chamber from the first chamber and connects the second chamber to the outside.

17. A brake booster for vehicles according to claim 16, further comprising a return spring connected to the input shaft to urge the input shaft to a neutral position in which the second chamber is connected to the first chamber and disconnected from the outside.

18. A brake booster for vehicles according to claim 17, wherein said valve comprises a poppet valve.

19. A brake booster for vehicles according to claim 11, further comprising a valve body for the valve and the valve body includes the air suction area in which the noise barrier is mounted, wherein an inner diameter of the air suction area is larger than an outer diameter of the noise barrier.

20. A brake booster for vehicles according to claim 11, further comprising a return spring connected to the input shaft to urge the input shaft to a neutral position in which the second chamber is connected to the first chamber and disconnected from the outside, wherein the return spring is disposed between the noise barrier and the valve.

* * * * *